United States Patent
Humboldt et al.

(10) Patent No.: US 10,197,315 B2
(45) Date of Patent: Feb. 5, 2019

(54) VALVE MECHANISM FOR AN AIR CONDITIONING SYSTEM

(71) Applicant: Mahle International GmbH, Stuttgart (DE)

(72) Inventors: Falk Humboldt, Schoemberg (DE); Michael Paul, Sachsenheim (DE)

(73) Assignee: Mahle International GmbH (DE)

( * ) Notice: Subject to any disclaimer, the term of this patent is extended or adjusted under 35 U.S.C. 154(b) by 62 days.

(21) Appl. No.: 15/335,007

(22) Filed: Oct. 26, 2016

(65) Prior Publication Data
US 2017/0115041 A1 Apr. 27, 2017

(30) Foreign Application Priority Data
Oct. 27, 2015 (DE) .................. 10 2015 221 002

(51) Int. Cl.
*F16K 47/04* (2006.01)
*F25B 41/06* (2006.01)
*B60H 1/00* (2006.01)

(52) U.S. Cl.
CPC ............ *F25B 41/062* (2013.01); *F16K 47/04* (2013.01); *B60H 2001/006* (2013.01); *F25B 2500/12* (2013.01)

(58) Field of Classification Search
CPC .... F25B 41/062; F25B 2500/12; F16K 47/04; B60H 2001/006
See application file for complete search history.

(56) References Cited

U.S. PATENT DOCUMENTS

| | | | |
|---|---|---|---|
| 4,044,991 A | 8/1977 | Waller | |
| 7,624,929 B2* | 12/2009 | Sohn | F16K 1/14 236/100 |
| 7,832,653 B2* | 11/2010 | Yukimoto | F16K 47/04 236/92 B |
| 8,052,064 B2* | 11/2011 | Yukimoto | F25B 41/062 236/92 B |

(Continued)

FOREIGN PATENT DOCUMENTS

DE 102009011562 A1 9/2010
EP 1705436 A2 9/2006

(Continued)

OTHER PUBLICATIONS

European Search Report dated Mar. 1, 2017 corresponding to related European Patent Application No. 16194207.3.

(Continued)

*Primary Examiner* — Eric Keasel
(74) *Attorney, Agent, or Firm* — Fishman Stewart PLLC

(57) ABSTRACT

A valve mechanism for an air condition circuit of an air condition system may include a valve housing enclosing a fluid duct for passing a fluid flow, a closure body arranged movably in the fluid duct between at least a closed position and an open position, and adjustment element operably connected to the closure body to move the closure body between the open position and the closed position, and a noise reduction device configured to facilitate a reduction of an operating noise when the fluid flow through the fluid duct. The noise reduction device may be disposed at one or more of the closure body, a valve seat, and the adjustment element.

20 Claims, 2 Drawing Sheets

(56) References Cited

U.S. PATENT DOCUMENTS

| | | | |
|---|---|---|---|
| 2006/0196201 A1* | 9/2006 | Sendo | B22D 17/007 62/222 |
| 2007/0095098 A1* | 5/2007 | Lee | B60H 1/00207 62/527 |
| 2007/0157661 A1* | 7/2007 | Yukimoto | F25B 41/062 62/527 |
| 2008/0282717 A1 | 11/2008 | Yukimoto | |

FOREIGN PATENT DOCUMENTS

| | | |
|---|---|---|
| EP | 1764568 A1 | 3/2007 |
| JP | H11-325658 A | 11/1999 |
| JP | 2007017127 A | 1/2007 |

OTHER PUBLICATIONS

English abstract for JP-H11-325658.
English abstract for DE-102009011562.
German search report for DE-102015221002.2, dated Sep. 5, 2016.

* cited by examiner

VALVE MECHANISM FOR AN AIR CONDITIONING SYSTEM

CROSS-REFERENCE TO RELATED APPLICATIONS

This application claims priority to German Patent Application No. DE 10 2015 221 002.2, filed Oct. 27, 2015, the contents of which are hereby incorporated by reference in its entirety.

TECHNICAL FIELD

The invention concerns a valve mechanism, especially an expansion valve, for an air conditioning circuit of an air conditioning system, as well as an air conditioning system with such a valve mechanism.

BACKGROUND

Valve mechanisms which are used as expansion valves in air conditioning systems are known in a variety of forms from the prior art.

The problem with such expansion valves is often that coherent vibrations can be produced when a refrigerant flows through the valve opening in the flow of refrigerant, resulting in an unwanted noise production in the valve mechanism.

Given this background, EP 1764 568 A1 discusses a valve mechanism with turbulence generating elements which ensure a turbulent flow of refrigerant at the valve opening. This is supposed to prevent gas bubbles in the liquid refrigerant for the most part or even entirely, so that the flow noise generated when passing through the valve opening should be lessened and homogenized.

SUMMARY

One problem which the present invention proposes to solve is to create an improved design for a valve mechanism which is distinguished in particular by a reduced operating noise.

This problem is solved by the subject matter of the independent patent claims. Preferred embodiments are the subject matter of the dependent patent claims.

Accordingly, the basic notion of the invention is to outfit a valve mechanism in the region of its valve opening closable by a closure body with a noise reduction device. The installation of such a noise reduction device in the region of the valve opening means that vibrations occurring there in the closure body and in the adjustment element for moving the closure body, which subsequently lead to said noise production, can be significantly reduced or even entirely prevented. As a result, such a vibration reduction also leads to a lessening of said noise production.

A valve mechanism according to the invention, especially an expansion valve, for an air conditioning circuit of an air conditioning system comprises a valve housing, which encloses a fluid duct through which a fluid can flow, especially a coolant or refrigerant. In the fluid duct there is arranged a closure body which can move relative to the valve housing. In a closed position, the closure body closes a valve opening present in the fluid duct and enclosed by a valve seat and bears against the valve seat for this purpose. Said valve opening with suitable dimensioning of the fluid duct, especially with reduced diameter in the region of the valve opening, can form an expansion valve together with the valve seat and the closure body. In an open position, the closure body is arranged to release the valve opening at a distance from the valve seat. By means of an adjustment element, the closure body can be moved between the open position and the closed position. For this, the adjustment element can be connected to a suitable driving device, especially an electric, hydraulic or pneumatic actuator for its drive.

According to the invention, a noise reduction device is configured at the closure body and/or at the valve seat and/or at the adjustment element, and accomplishes a reduction of the operating noise of the valve mechanism when the fluid flows through it.

Advisedly, the closure body can be designed as a closure ball. Alternatively or additionally, the adjustment element can be designed as a control tappet. Both measures, alone or in combination, facilitate a technical realization of the valve mechanism as an expansion valve with reduced fluid duct diameter in the region of the valve opening.

In a preferred embodiment, the noise reduction device is designed as a surface structure with a plurality of elevations protruding into the fluid duct. Alternatively or additionally, the surface structure has a plurality of depressions arranged on the surface. In one preferred variant, said elevations and depressions can be arranged in the same surface structure, especially preferably alternating next to each other. The mentioned steps, alone or in combination, accomplish an especially pronounced reduction of the operating noise generated by the valve mechanism.

According to an advantageous modification, the individual elevations have a height of at most 1 mm, preferably at most 0.2 mm, especially preferably a height of essentially 0.1 mm. Experimental investigations have shown that elevations with such a height provide an especially good reduction of the operating noise of the valve mechanism.

According to another advantageous modification, the individual depressions have a depth of at most 1 mm, preferably at most 0.2 mm, especially preferably a depth of essentially 0.05 mm. Experimental investigations have shown that depressions with such a depth provide an especially good reduction of the operating noise of the valve mechanism.

In another advantageous modification, the surface structure has a lateral extension between 0.1 $mm^2$ and 1 $mm^2$. Experimental investigations have shown that a lateral extension of the surface structures in the mentioned range is associated with an especially good reduction of the operating noise of the valve mechanism.

According to an advantageous modification of the invention, the surface structure is arranged in an axial end section of the adjustment element facing the closure body, on its circumferential side. This measure as well assists the desired noise reduction.

Moreover, simulation calculations have shown surprisingly that an additional noise reduction can be achieved when the surface structures essential to the invention are designed on both the valve seat and the adjustment element, and such that the two surface structures are positioned opposite each other. In this scenario, the fluid duct through which the fluid flows is therefore enclosed on both sides by the surface structure essential to the invention, so that an especially pronounced dampening effect can be achieved.

In another preferred embodiment, the surface structure of the closure body is arranged at least partly in a surface region which touches the valve seat in the closed position of the closure body.

In another preferred embodiment, which can be combined with the above explained preferred embodiment, the surface structure of the valve seat is arranged at least partly in a surface region which touches the closure body in the closed position of the closure body.

In another preferred embodiment, the valve seat comprises a first seat section in a longitudinal cross section along a movement direction of the adjustment element that passes into a second seat section in the movement direction. In the second seat section, the valve seat tapers, especially in conical manner, away from the first seat section to produce the valve mechanism as an expansion valve. The closure body in the closed position bears against the second seat section, and the second seat section passes along the movement direction into a third seat section. In this variant, the surface structure is configured on at least one of the three seat sections on an internal circumferential side enclosing the fluid duct. Especially preferably, the diameter of the fluid duct is substantially constant in the first and third seat sections.

Laboratory investigations have further shown that an especially good noise reduction can be achieved when said surface structure of the noise reduction device is realized as a kind of a roughened surface.

The effect of noise reduction by the noise reduction device can be realized in especially pronounced form if the roughened surface has a roughness Rz of more than 16 μm.

According to an advantageous modification, the surface structure is formed as a ring or a ring segment and extends around the surface of the closure body along a direction perpendicular to the movement direction. Preferably, the surface structure runs entirely around it.

To improve the sealing effect of the closure element in its closed position, in another preferred embodiment it is proposed that no surface structure is formed in a surface section of the closure body bearing against the valve seat in the closed position of the closure body. The same effect of an improved sealing action can be achieved by having no surface structure formed in a surface section of the valve seat against which the closure body bears in its closed position.

In another preferred embodiment, the plurality of elevations and/or depressions is arranged gridlike on the surface. In an equally preferred alternative embodiment, the plurality of elevations and/or depressions is distributed irregularly on the surface. Both variants, which can also be combined, accomplish an especially effective noise dampening.

Advisedly, the elevations and/or depressions can be formed in substantially round or substantially elongate form in a top view of the surface structure. This measure accomplishes an especially pronounced noise reduction.

Especially advisedly, the depressions can be formed as craters or funnels. This measure also accomplishes an especially pronounced noise reduction.

The invention furthermore concerns an air conditioning system, especially for a motor vehicle. The air conditioning system comprises an air conditioning circuit, in which a previously explained valve mechanism is arranged. Thus, the benefits of the valve mechanism according to the invention are transferred to the air conditioning system according to the invention.

Further important features and benefits of the invention will emerge from the subclaims, the drawings, and the corresponding description of the figures with the aid of the drawings.

Of course, the above mentioned features and those yet to be mentioned can be used not only in the particular indicated combination, but also in other combinations or alone, without leaving the scope of the present invention.

Preferred exemplary embodiments of the invention are represented in the drawings and shall be explained more closely in the following description, where the same reference numbers pertain to the same or similar or functionally equivalent components.

BRIEF DESCRIPTION OF THE DRAWINGS

In the figures, each time schematically.

DETAILED DESCRIPTION

Figure 1:
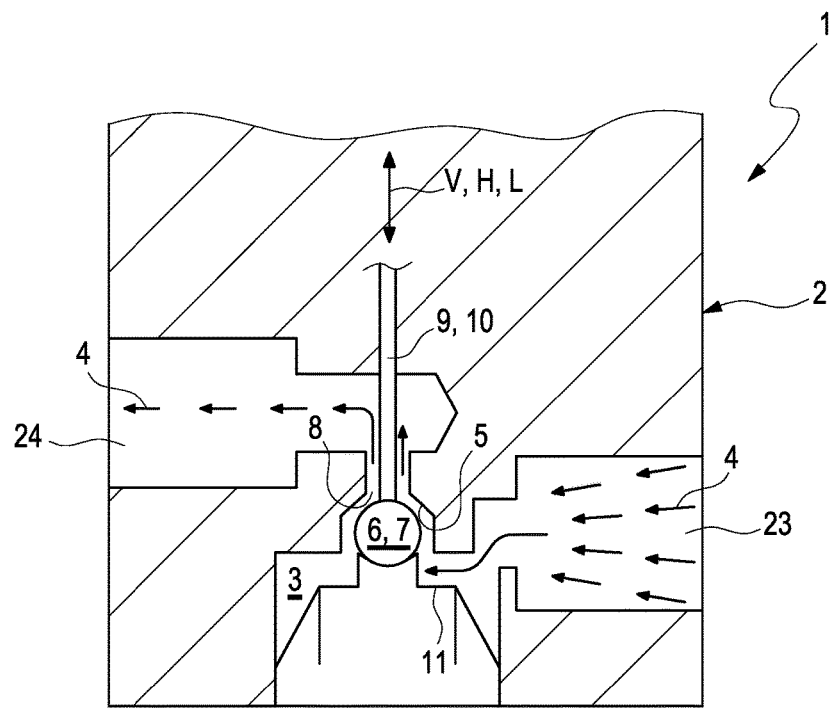
FIG. 1 shows an example of a valve mechanism according to the invention in a longitudinal cross section.

FIG. 1 shows an example of a valve mechanism 1 according to the invention, which can be used as an expansion valve for an air conditioning system, in a longitudinal cross section. The valve mechanism 1 comprises a valve housing 2, which encloses a fluid duct 3 through which a fluid 4 can flow. In the valve housing 2 there is present a fluid inlet 23, through which the fluid 4, typically a coolant or refrigerant of the air conditioning system, can be introduced into the fluid duct 3. Through a fluid outlet 24 provided on the valve housing 2 the fluid 4 is taken out from the fluid duct 3 once again.

Figures 2, 3:
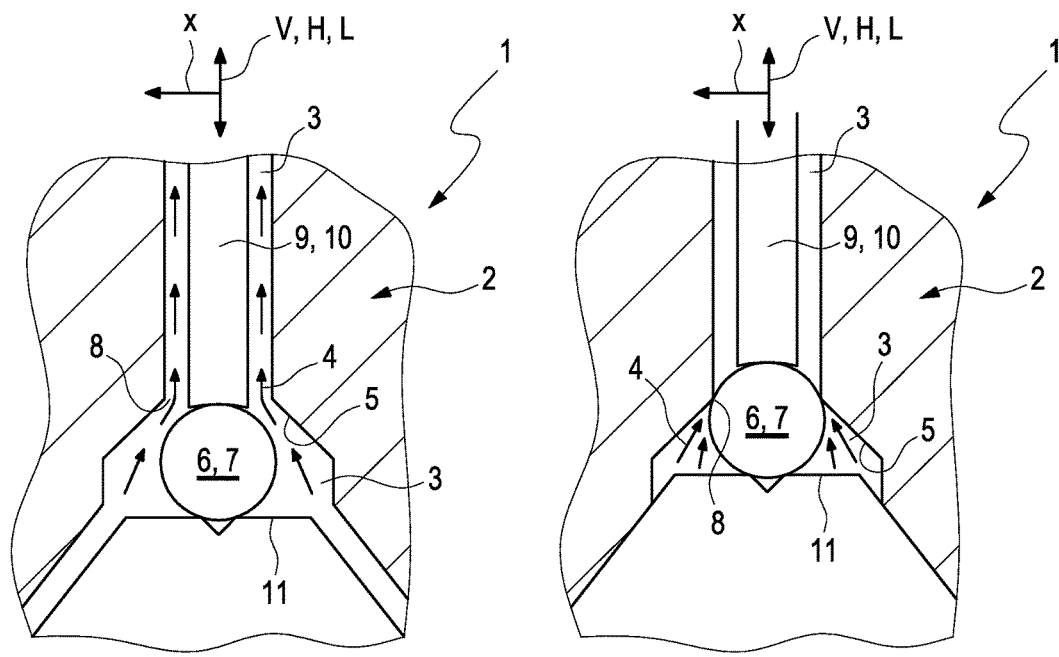
FIG. 2 shows a detail representation of FIG. 1 with the valve closed.
FIG. 3 shows a detail representation of FIG. 1 with the valve opened.

In the valve housing 2 or in the fluid duct 3 there is formed a valve seat 5, which encloses a valve opening 8. In the fluid duct 3, moreover, there is arranged a closure body 6 which can move relative to the valve housing 2, being preferably designed as a closure ball 7. The closure body 6 or the closure ball 7 can be moved between a closed position and an open position. In the closed position, the closure body 6 bears against the valve seat 5 for the closing of the valve opening 8, so that no fluid 4 can flow through the valve opening 8. This situation is shown for clarity in a separate representation in FIG. 3.

In the open position, the closure body 6 releases the valve opening 8 for the fluid 4 to flow through and for this it is arranged at a distance from the valve seat 5. This situation is shown for clarity in a separate representation in FIG. 2.

The moving of the closure body 6 between the open position and the closed position is performed with the aid of an adjustment element 9, which can be designed as a control tappet 10. The adjustment element 9 can move along a movement direction V in the fluid duct 3, which can be a main flow direction H of the fluid 4 flowing through the valve opening 8. The movement direction V can be identical to a longitudinal direction L of the fluid duct 3. The adjustment element 9, in turn, can be connected to a pneumatic or hydraulic or electrical actuator (not shown in the figures) for its drive. The adjustment element 9 moves the closure body 6 by mechanical contact between the open position and the closed position. The closure body 6 can be biased by means of a tensioning element 11, such as a kind of elastic spring element, against the adjustment element 9.

In the example of FIG. 1, the tensioning element 11 also biases the adjustment element 9 against the valve seat 5 and thus toward its closed position.

The valve mechanism 1 moreover comprises a noise reduction device 12, by means of which noises, especially vibration-like noises which are generated by vibrations of the closure body 7 as well as the adjustment element 9 when the fluid 4 flows through the valve opening 8, are dampened. From FIG. 4, which shows the valve mechanism in analogous manner to FIG. 2 in a detail representation in the region of the valve opening 8, it can be observed that the noise reduction device 12 can be formed on the closure body 6 and/or on the valve seat 5 and/or on the control tappet 10. In all three cases, the noise reduction device 12 is designed as a surface structure 13a, 13b, 13c with a plurality of elevations 14 and, alternatively or additionally, with a plurality of depressions 25.

Figure 4:
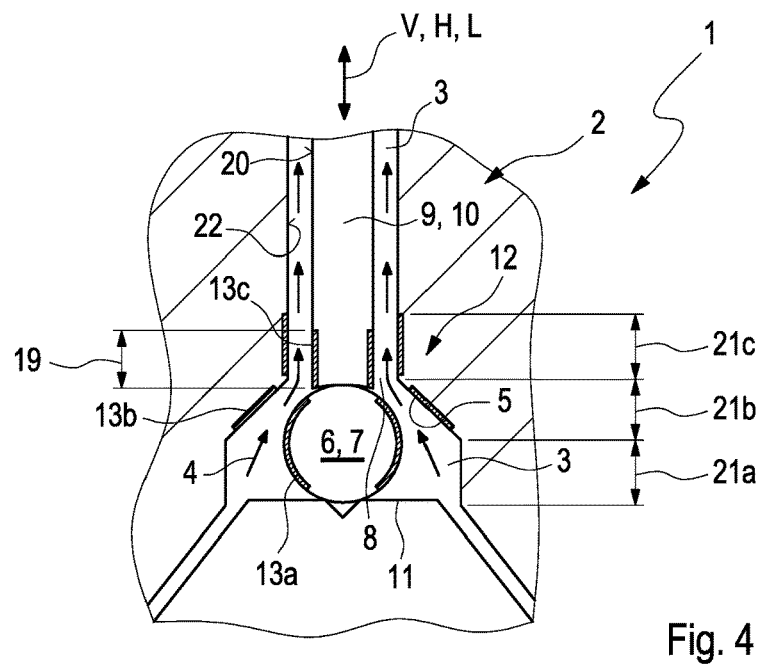
FIG. 4 shows a detail representation of FIG. 1, in which the noise reduction device essential to the invention is shown.
Figure 5:
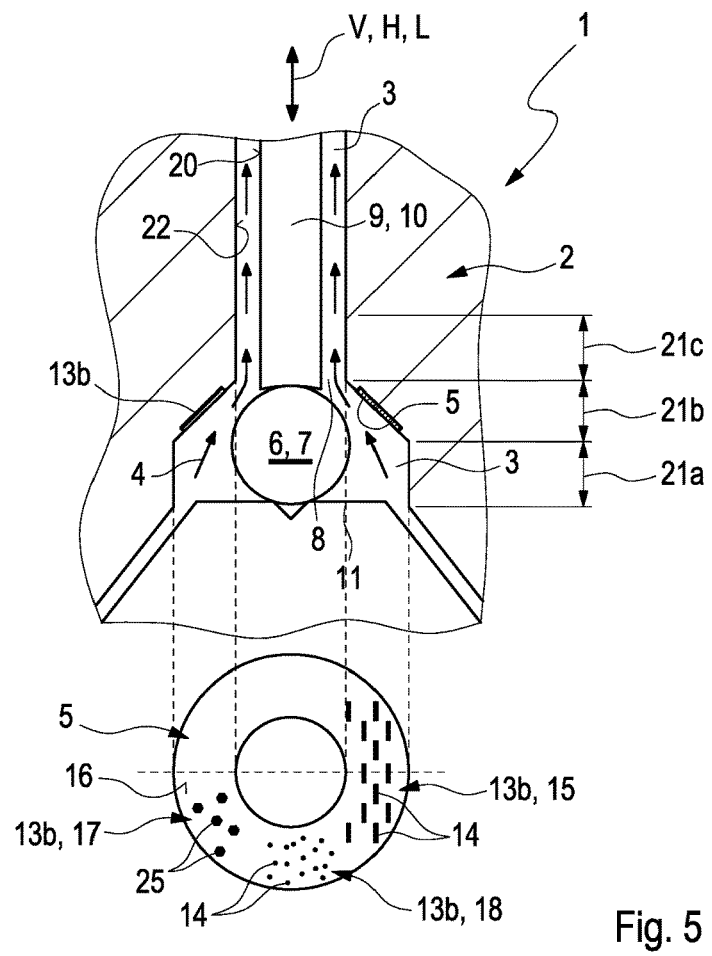
FIG. 5 shows a representation showing possible configurations of the surface structure forming the noise reduction device.

For clarity, FIG. 5 shows in addition to the representation of FIG. 4 a top view of the valve seat 5 along the movement direction V of the adjustment element 9. As an example, three different surface structures 13b are shown: the surface structure 13b additionally designated as 15 comprises a plurality of elevations 14, which are arranged in a grid on the surface 16 of the valve seat 5 and protrude from the surface 16 into the fluid duct 3. The plurality of elevations 14 can, however, also be distributed irregularly on the surface 16, as is shown for example for the surface structure 13b additionally designated as 18. The elevations 14 can be elongate or round (not shown) in configuration, as shown for the surface structure 15.

However, in place of irregularly arranged elevations 14, there can also be depressions 25 arranged irregularly on the surface 16, as is the case with the surface structure 13b additionally designated as 17.

The depressions 25 can be in the form of craters or funnels. In one variant not shown in the figures, the depressions 25 can also be in a regular arrangement.

The elevations 14 of the surface structure 17 differ from the elevations 14 of the surface structure 18 in that the former are in the form of craters or funnels with individual geometry and the latter are round, each with an identical geometry. A combination of the aforementioned examples is also conceivable, such as a combination of gridlike elevations 14 each with round or crater-like elevations 14 (not shown). Instead of a round geometry, as shown for the elevations 14 of the surface structure 18, an elongate configuration is possible, as is represented for the elevations 14 of the surface structure 15.

All of the above described examples for elevations 14 apply not only to elevations 14 which protrude from the surface 16 into the fluid duct 3, but also for depressions 25 provided in the surface 16, and vice versa. A combination of depressions 25 and elevations 14 is also conceivable.

Preferably, the individual elevations 14 have a height of at most 1 mm, preferably at most 0.2 mm, especially preferably a height of essentially 0.05 mm. In corresponding fashion, the depressions 25 have a depth of at most 1 mm, preferably at most 0.2 mm, especially preferably a depth of substantially 0.05 mm. The height or depth here is measured along a direction perpendicular to the surface 16.

The above explanations for possible configurations of the surface structure 13b on the valve seat 5 also apply, mutatis mutandis, for the surface structures 13a, 13c on the closure body 6 and on the adjustment element 9.

The surface structure 13c provided on the surface of the adjustment element 9 or the control tappet 10 is arranged in an axial end section 19 of the adjustment element 9 or the control tappet 10 facing the closure body 6, on its circumferential side 20.

In the exemplary scenario, the surface structure 13a of the closure body 6 is arranged at least partially in a surface region of the closure body 6 which touches the valve seat 5 in the closed position of the closure body 6. In analogous manner, the surface structure 13b of the valve seat 5 is arranged at least partially in a surface region which touches the closure body 6 in the closed position of the closure body 6. Alternatively, no surface structures 13a, 13b can be formed on the closure body 6 and/or on the valve seat 5 in those surface sections touching each other in the closure body 6, so as to rule out any lessening of the sealing action of the closure body 6 connected with this.

The valve seat 5 comprises a first seat section 21a in the longitudinal cross section shown in the figures along the movement direction V of the adjustment element 9, which passes into a second seat section 21b in the movement direction V. The first seat section 21a can have a constant diameter along the movement direction V. The second seat section 21b tapers conically away from the first seat section 21a. In its closed position, the closure body 6 or the closure ball bears against the valve seat 5. The second seat section 21b passes along the movement direction V away from the first seat section 21a into a third seat section 21c, which can have a constant diameter along the movement direction V. The surface structure 13b of the valve seat 5 forming the noise reduction device 12 can be formed on an internal circumferential side 22 enclosing the fluid duct 3 on at least one of the three seat sections 21a, 21b, 21c. In the example of FIG. 4, the surface structure 13b is shown as an example in the second and third seat sections 21b, 21c. The surface structure 13b formed on the third seat section 21c of the valve seat 5 at the internal circumferential side 22 of the fluid duct 3 lies opposite the surface structure 13c formed on a circumferential side 20 of the adjustment element 9. The surface structure 13a formed on the closure body 6 can be formed as a ring or a ring segment and extend on the surface of the closure body 6 along a direction X perpendicular to the movement direction V, preferably entirely around the circumference.

The surface structures 13a, 13b, 13c with the elevations 14 and/or depressions 25 can be realized in the manner of a roughened surface, having a roughness Rz of more than 16 μm.

The invention claimed is:

1. A valve mechanism for an air conditioning circuit of an air conditioning system, comprising:
    a valve housing enclosing a fluid duct for passing a fluid flow, the fluid duct defining a valve opening;
    a closure body arranged movably in the fluid duct, wherein in a closed position the closure body bears against a valve seat, and wherein in an open position the closure body is arranged at a distance from the valve seat;
    an adjustment element operably connected to the closure body to move the closure body between the open position and the closed position; and
    a noise reduction device disposed at one or more of the closure body, the valve seat and the adjustment element, and
    wherein the noise reduction device includes a surface structure, and wherein the surface structure includes at least one of a plurality of elevations protruding into the fluid duct and a plurality of depressions arranged on a surface of said one or more of the closure body, the valve seat and the adjustment element.

2. The valve mechanism according to claim 1, wherein the adjustment element is structured as a control tappet.

3. The valve mechanism according to claim 1, wherein when in the closed position, no fluid can flow through the valve opening.

4. The valve mechanism according to claim 1, wherein at least one of the plurality of elevations has a height of at most 1 mm.

5. The valve mechanism according to claim 1, wherein at least one of the plurality of depressions has a depth of at most 1 mm.

6. The valve mechanism according to claim 1, wherein the surface structure has a lateral extension having a height between 0.1 mm and 1 mm.

7. The valve mechanism according to claim 1, wherein the surface structure is arranged in an axial end section on a circumferential side of the adjustment element facing the closure body.

8. The valve mechanism according to claim 1, wherein the surface structure is disposed on the valve seat and the adjustment element, such that the surface structure disposed on the valve seat is positioned opposite the surface structure disposed on the adjustment element.

9. The valve mechanism according to claim 1, wherein the surface structure is disposed on the closure body and arranged at least partly in a surface region that touches the valve seat when the closure body is in the closed position.

10. The valve mechanism according to claim 1, wherein the surface structure is disposed on the valve seat and arranged at least partly in a surface region that touches the closure body when the closure body is in the closed position.

11. The valve mechanism according to claim 1, wherein:
the valve seat includes a first seat section in a longitudinal cross section along a movement direction of the adjustment element that passes into a second seat section in the movement direction, wherein the second seat section of the valve seat tapers away from the first seat section and the closure body engages the second seat section when the closure body is in the closed position;
wherein the second seat section passes along the movement direction into a third seat section; and
wherein the surface structure is disposed on at least one of the first seat section, the second seat section and the third seat section on an internal circumferential side of the housing enclosing the fluid duct.

12. The valve mechanism according to claim 1, wherein the surface structure is configured as a roughened surface.

13. The valve mechanism according to claim 12, wherein the roughened surface has a roughness of more than 16 μm.

14. The valve mechanism according to claim 1, wherein the surface structure is provided on the closure body and configured as a ring and extends at least partially around the surface of the closure body along a direction perpendicular to the movement direction.

15. The valve mechanism according to claim 1, wherein the surface structure is disposed on one of a surface section of the closure body bearing against the valve seat when the closure body is in the closed position of the closure body and a surface section of the valve seat against which the closure body bears when the closure body is in the closed position.

16. The valve mechanism according to claim 1, wherein at least one of the plurality of elevations and the plurality of depressions is arranged in a grid-like configuration on the surface.

17. The valve mechanism according to claim 1, wherein at least one of the plurality of elevations and the plurality of depressions are distributed irregularly on the surface.

18. The valve mechanism according to claim 1, wherein at least one of the plurality of elevations and the plurality of depressions are structured in at least one of a substantially round shape and a substantially elongate shape in a top view of the surface structure.

19. The valve mechanism according to claim 1, wherein the plurality of depressions are structured as at least one of craters and funnels.

20. An air conditioning system for a motor vehicle, comprising:
an air conditioning circuit; and
a valve mechanism arranged in the air conditioning circuit, the valve mechanism including:
a valve housing enclosing a fluid duct for communicating a fluid flow, the fluid duct defining a valve opening;
a valve seat enclosing the valve opening;
a closure body arranged movably in the fluid duct between a closed position and an open position, wherein the closure body engages the valve seat in the closed position to bear against the valve seat, and the closure body is arranged at a distance from the valve seat in the open position;
an adjustment element operably connected to the closure body to move the closure body between the open position and the closed position; and
a noise reduction device disposed at one or more of the closure body, the valve seat and the adjustment element,
wherein the noise reduction device includes a surface structure, and wherein the surface structure includes at least one of a plurality of elevations protruding into the fluid duct and a plurality of depressions arranged on a surface of said one or more of the closure body, the valve seat and the adjustment element, and
wherein when in the closed position, no fluid can flow through the valve opening.

* * * * *